(12) United States Patent
Koti et al.

(10) Patent No.: US 11,396,300 B2
(45) Date of Patent: Jul. 26, 2022

(54) MULTI-VEHICLE LOAD DELIVERY MANAGEMENT SYSTEMS AND METHODS

(71) Applicant: Cummins Inc., Columbus, IN (US)

(72) Inventors: Archit N. Koti, Columbus, IN (US); Jairo Andres Sandoval Leon, Columbus, IN (US); Vivek Anand Sujan, Columbus, IN (US); Patrick J. Shook, Franklin, IN (US); Apurva Arvind Chunodkar, Greenwood, IN (US); Kenneth M. Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 478 days.

(21) Appl. No.: 16/432,254

(22) Filed: Jun. 5, 2019

(65) Prior Publication Data

US 2019/0283765 A1 Sep. 19, 2019

Related U.S. Application Data

(63) Continuation of application No. PCT/US2017/064444, filed on Dec. 4, 2017.

(Continued)

(51) Int. Cl.
*B60W 40/105* (2012.01)
*B60W 40/04* (2006.01)
(Continued)

(52) U.S. Cl.
CPC .......... *B60W 40/105* (2013.01); *B60K 6/46* (2013.01); *B60W 20/12* (2016.01); *B60W 30/14* (2013.01);
(Continued)

(58) Field of Classification Search
CPC .............. B60W 40/105; B60W 40/04; B60W 2550/306; B60W 2550/302;
(Continued)

(56) References Cited

U.S. PATENT DOCUMENTS 6,363,311 B1 * 3/2002 Kuroda ............... B60W 30/045
 701/96
6,484,078 B1 11/2002 Kageyama
(Continued)

FOREIGN PATENT DOCUMENTS

EP 2409884 1/2012

OTHER PUBLICATIONS

Search Report and Written Opinion, PCT Appln. No. PCT/US17/64444, dated Feb. 20, 2018, 10 pgs.

*Primary Examiner* — Khoi H Tran
*Assistant Examiner* — Rodney P King
(74) *Attorney, Agent, or Firm* — Taft Stettinius & Hollister LLP

(57) ABSTRACT

Disclosed are various techniques to optimize load delivery management of multiple vehicles along route. The optimization can involve evaluating vehicle-in-front information along with look ahead data to determine a recommended speed target and/or idle stop times and durations. The optimization can also involve determining bottleneck conditions from one or more vehicles and/or one or more infrastructure conditions and providing one or more recommended actions in response thereto.

23 Claims, 9 Drawing Sheets

Related U.S. Application Data

(60) Provisional application No. 62/429,969, filed on Dec. 5, 2016.

(51) Int. Cl.
  *G05D 1/02* (2020.01)
  *G08G 1/01* (2006.01)
  *G08G 1/052* (2006.01)
  *B60K 6/46* (2007.10)
  *B60W 30/17* (2020.01)
  *B60W 20/12* (2016.01)
  *B60W 30/14* (2006.01)
  *B60W 30/16* (2020.01)

(52) U.S. Cl.
  CPC ............ *B60W 30/16* (2013.01); *B60W 30/17* (2013.01); *B60W 40/04* (2013.01); *G05D 1/0291* (2013.01); *G08G 1/0137* (2013.01); *G08G 1/052* (2013.01); *B60W 2554/4041* (2020.02); *B60W 2554/801* (2020.02); *B60W 2554/804* (2020.02); *B60W 2556/65* (2020.02); *B60W 2720/103* (2013.01); *G05D 2201/021* (2013.01)

(58) Field of Classification Search
  CPC .......... B60W 2550/308; G08G 1/0137; G08G 1/052; G05D 2201/021; G05D 1/0291
  USPC ....................................................... 701/117
  See application file for complete search history.

(56) References Cited

U.S. PATENT DOCUMENTS

| | | | |
|---|---|---|---|
| 6,988,591 B2 | 1/2006 | Uranaka et al. | |
| 8,204,666 B2* | 6/2012 | Takeuchi | B60K 28/06 |
| | | | 701/70 |
| 8,216,734 B2* | 7/2012 | Mizuno | H01M 8/04559 |
| | | | 429/432 |
| 8,275,508 B1 | 9/2012 | Adams et al. | |
| 8,649,963 B2 | 2/2014 | Young et al. | |
| 8,670,907 B2* | 3/2014 | Kondou | F16H 59/66 |
| | | | 701/55 |
| 9,026,349 B2 | 5/2015 | Young et al. | |
| 9,046,371 B2 | 6/2015 | Casson et al. | |
| 9,165,330 B2 | 10/2015 | Ueda et al. | |
| 9,248,790 B2* | 2/2016 | Bradley | B60R 16/0236 |
| 9,460,617 B2* | 10/2016 | Beaurepaire | G08G 1/012 |
| 9,616,888 B2* | 4/2017 | Pilutti | B60W 30/143 |
| 9,676,382 B2* | 6/2017 | Schwartz | B60W 20/12 |
| 9,744,981 B2* | 8/2017 | Niinomi | B61L 27/0016 |
| 2012/0221234 A1* | 8/2012 | Sujan | G06Q 10/04 |
| | | | 701/123 |
| 2013/0299282 A1 | 11/2013 | Kugiya et al. | |
| 2015/0081156 A1 | 3/2015 | Trepagnier et al. | |
| 2021/0155264 A1* | 5/2021 | MacPherson | B60G 11/27 |
| 2021/0311497 A1* | 10/2021 | Okazaki | G05D 1/0293 |

* cited by examiner

MULTI-VEHICLE LOAD DELIVERY MANAGEMENT SYSTEMS AND METHODS

CROSS-REFERENCE TO RELATED APPLICATION

The present application is a continuation of International Patent Application No. PCT/US17/6444 filed on Dec. 4, 2017, which claims the benefit of the filing date of U.S. Provisional Application Ser. No. 62/429,969 filed on Dec. 5, 2016, which are incorporated herein by reference.

TECHNICAL FIELD

The present invention generally relates to load delivery management for multiple vehicles.

BACKGROUND

Load delivery vehicle operators often seek to improve vehicle performance metrics, while addressing mission metrics. Examples of mission metrics include, but are not limited to, reduction in fuel consumption, improvements in productivity and reduction in life cycle costs. For example, in some cases, mining operators are provided with the option of making trade off decisions between competing truck performance metrics in an attempt to achieve desired mine haul performance metrics.

For example, a haul truck in a mine typically runs in route that includes a loop between the loading station and the dropping station. A fleet of haul trucks operate cyclically in the closed loop between the loading and dropping station. Typically, in open pit mines the loading is at the bottom of the mine and the dropping is at the top of the mine. In mine haul and other types of environments, better overall fleet efficiency and/or productivity can be achieved by coordinating operations of all the vehicles in the closed loop or route rather than controlling each vehicle separately. Accordingly, there remains a need for further contributions in this area of technology.

SUMMARY

One embodiment of the present invention includes a unique system for improving load delivery management of multiple vehicles in a load delivery system, such as in mine haul applications, highway line haul fleet applications, and other applications. Other embodiments include apparatuses, systems, devices, hardware, methods, and combinations for efficiency gains in multi-vehicle load delivery operations.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings. Further embodiments, forms, features, aspects, benefits, and advantages of the present application shall become apparent from the description and figures provided herewith.

DETAILED DESCRIPTION

Figure 1:
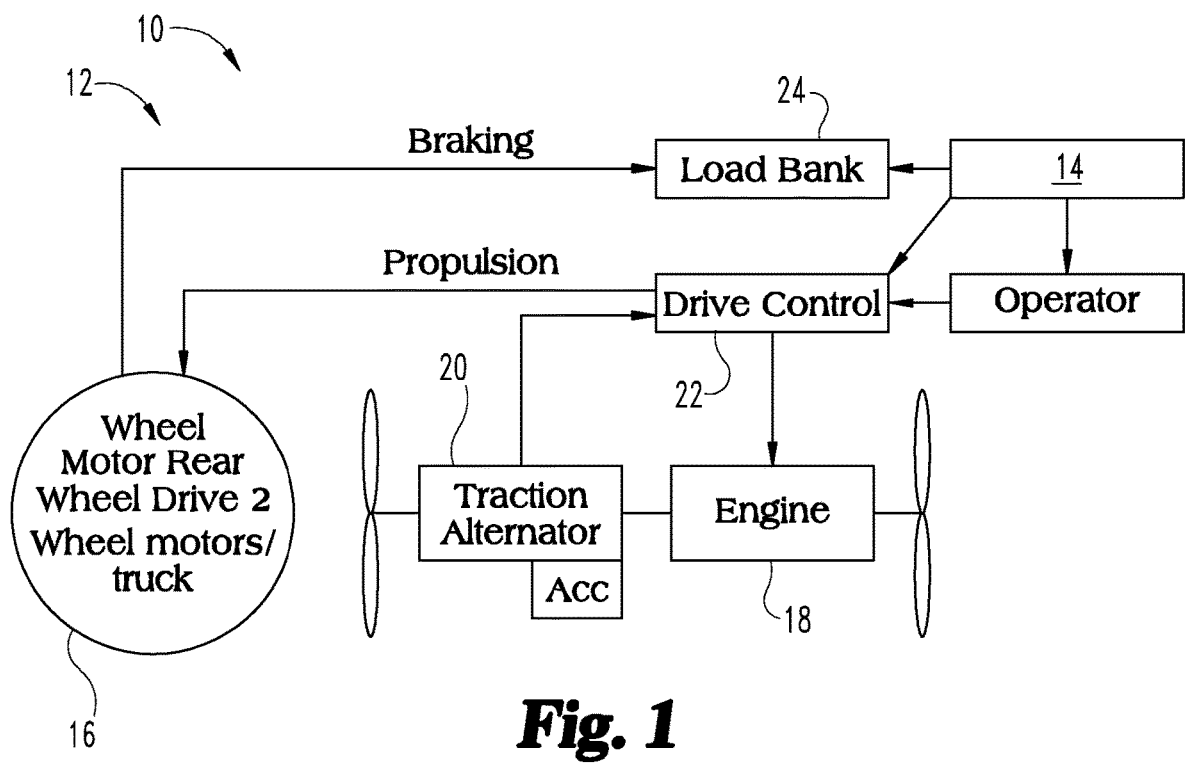
FIG. 1 depicts an embodiment of a vehicle that is a mine haul truck with a diesel electric driveline.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure encompasses a multi-vehicle environment and information from one or more vehicles that is used in systems and methods to provide fuel consumption/productivity benefits for one or more of the vehicles. Embodiments include systems, methods and apparatus for optimizing vehicle idling management, vehicle speed management with multiple vehicles, weakest link vehicle management, and load delivery management. While specific embodiments are discussed below using a specific application of mine haul trucks, the present disclosure is applicable to other applications as well, such as delivery vehicles, mass transit vehicles, vehicle fleets, etc.

In the optimum vehicle idling embodiment, the systems and methods optimally determine the idle location and idle time for one, many or all the vehicles that are traversing the route. This optimal idling time may/may not be the minimum idling for a loop or segment within the route, but within given constraints could optimize fuel consumption/productivity for the entire route based on all vehicles travelling the route.

In the multiple or dual vehicle speed management (VSM) embodiment, the information from the vehicle-in-front is used by a trailing vehicle, along with look ahead information regarding route grade and/or rolling resistance among other such factors, to modulate a vehicle speed target and/or recommend vehicle idle location and optimum idle time for improved efficiency for the route, such as improved productivity, fuel consumption, total load delivery, etc. Dual or multi-vehicle VSM augments traditional single VSM schemes and includes additional information from the vehicle-in-front to better modulate the trailing vehicle speed, leading to productivity and/or efficiency improvements. In addition to modulating vehicle speed targets, dual or multi-vehicle VSM can recommend the ideal stop location and optimum vehicle idle time (duration) that leads to overall efficiency improvement for the route. The look ahead information or conditions can include one or more of a look ahead power requirement, a look ahead stop location; a look ahead distance window, a look ahead route grade, a look ahead rolling resistance, a look ahead drop and load locations, a look ahead stop time, and look ahead speed limits.

In the weakest link embodiment, systems and methods utilize information from all vehicles in the route, in addition to look ahead information such as route grade/rolling resistance, to identify the vehicle(s) that is (are) causing lower efficiency of the route and to recommend/perform specific tasks, such as changing vehicle speed, rearranging of vehicles in the route, changing allowed payload on vehicles, removing vehicle(s) from the route, assigning additional stop locations/stop times for particular vehicles, etc., on the "weakest link" vehicle(s) or the group of vehicles in the route.

The multi-vehicle load delivery management embodiment includes systems and methods to utilize information from all the vehicles in the route as well as information from the infrastructure (loading station, shovels, dropping station, control center, etc.), in addition to look ahead information such as route grade/rolling resistance, to modulate a vehicle speed target and/or recommend vehicle idle location and optimum idle time that leads to overall improvement in efficiency for the mining operation.

FIG. 1 depicts a block diagram representation of an embodiment of a vehicle 10 such a mine haul truck with a hybrid mechanical-electric driveline 12. Other embodiments contemplate other types of vehicles and drivelines, and the present disclosure is not limited to mine haul trucks and hybrid drivelines. In one embodiment, the vehicle 10 includes a series electric architecture with or without an electric energy storage system. The architecture can be configured to decouple the engine speed from the vehicle speed so the engine operates on a load acceptance curve for load delivery management.

In an embodiment, the vehicle 10 with a diesel electric driveline 12 includes a vehicle speed management controller 14 communicatively coupled to the wheel motors 16 of the vehicle 10. In an embodiment, the vehicle includes a prime mover 18 such as an engine that is coupled to the drive wheels with a set of one or more of the following: a clutch (pressure plate, centrifugal, multiple, or other), geared transmission, another gearbox, geared or un-geared axle/hubs.

The vehicle speed management controller 14 is configured to issue one or more commands or outputs associated with the operation of the wheel motors 16 and/or prime mover 18 for load delivery management. In an embodiment, the vehicle speed management controller 14 is configured to issue one or more commands or outputs associated with the management of vehicle speed of the vehicle 10. In an embodiment, the vehicle speed management controller 14 is configured to issue one or more commands or outputs associated with the management of one or more actuators of vehicle 10, such as the clutch, in addition to the prime mover 18 and/or to a traction alternator system 20.

The vehicle speed management controller 14 is communicatively coupled the traction alternator system 20 and prime mover 18 through drive control system 22. The operator may also provide inputs to drive control system 22 to control the speed and operation of vehicle 10 based on, for example, a vehicle speed target and idle stop location/duration output or recommendation from vehicle speed and management controller 14. The drive control system 22 is communicatively coupled to a load bank 24 and to vehicle speed management controller 14. In one embodiment, the drive control system 22 is incorporated into the vehicle speed management controller 14. The vehicle speed management controller 14 is communicatively coupled to the motive system of the vehicle 10 including prime mover 18 and traction alternator 20.

The vehicle speed management controller 14 is configured to receive vehicle environment information, operating parameters, and operator requests as input parameters and responsively issue one or more commands to control the diesel engine system. The diesel engine system may include, for example an alternator system 20, air conditioner system and a radiator system. In an embodiment, the vehicle speed management controller 14 provides engine speed and torque references and limits to improve productivity of the vehicle performance metrics. In an embodiment, the vehicle speed management controller 14 provides engine speed and torque references and limits to improve productivity/efficiency at the route level, such as for a mine route.

Figure 2:
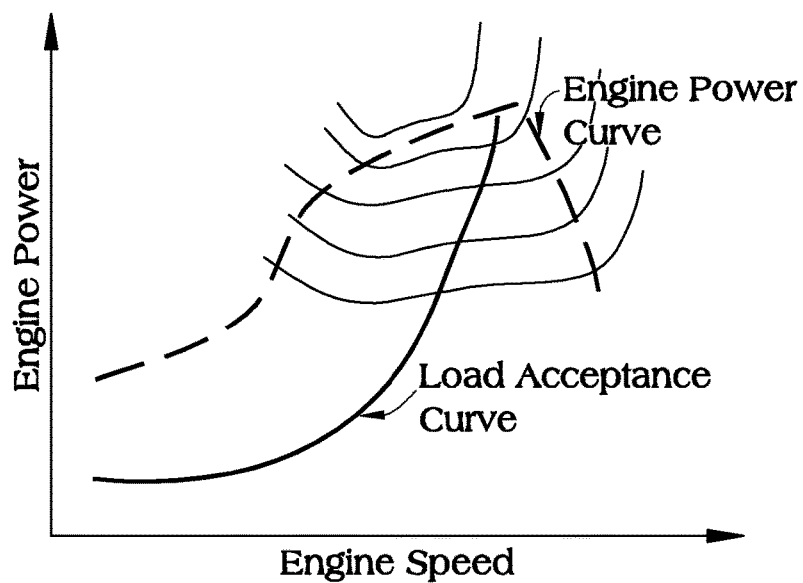
FIG. 2 depicts a load acceptance curve for the engine of the vehicle of FIG. 1.

FIG. 2 show a plot of engine speed versus engine power with an engine power curve and a load acceptance curve. In one embodiment, the vehicle speed management controller 14 can be configured to decouple the engine speed from the vehicle speed so the engine operates on the load acceptance curve to improve efficiency for load delivery management.

Figure 3:
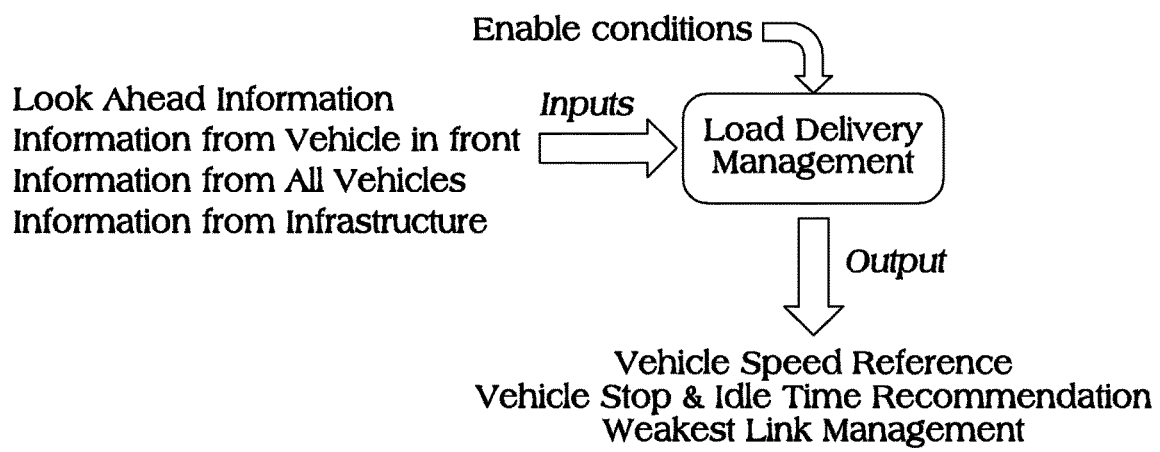
FIG. 3 depicts a flow diagram representation of an embodiment of a load delivery management system of the vehicle of FIG. 1.

As shown in FIG. 3, vehicle speed management controller 14 receives one or more inputs, such as look ahead information, information from a vehicle-in-front, information from all vehicles in a route, and/or information from infrastructure along with enable conditions. Vehicle speed management controller 14 processes one or more of these inputs in response to enable conditions being met. Vehicle speed management controller 14 outputs, based on these one or more inputs, one or more of a vehicle speed target or reference, a vehicle stop and idle time recommendation, or a weakest link management recommendation to optimize mine haul truck performance metrics such as fuel consumption and productivity for one or more of the vehicles in the route.

Figure 4:
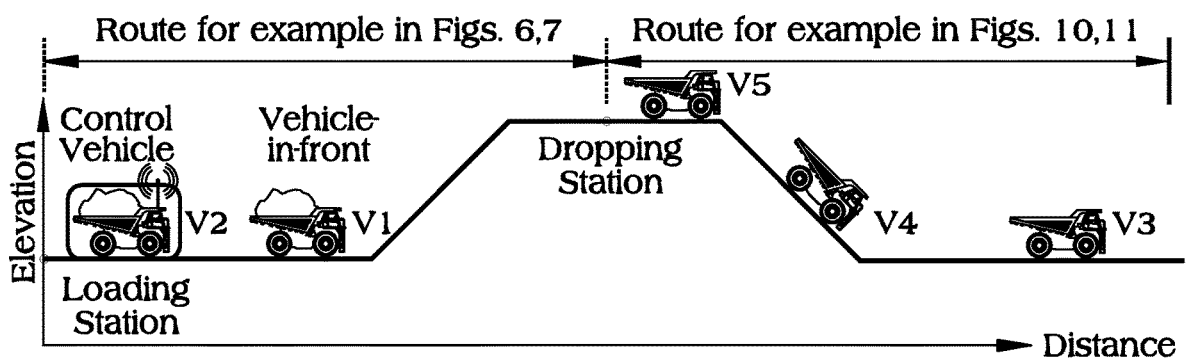
FIG. 4 depicts an embodiment of a multi-vehicle load management system along a route with a loading station and a dropping station.

FIG. 4 shows an embodiment of a mine haul route with changing elevation and multiple vehicles V1, V2, V3, V4 and V5 (e.g. a fleet of mine haul trucks) along the route. The route includes infrastructure such as a loading station and a dropping station. Vehicle V2 is designated as a control vehicle. Vehicle V1 is designated as the vehicle-in-front of the control vehicle V2. In the illustrated embodiment of mine haul trucks, vehicle mass is relatively high and vehicle speed is relatively low, so aerodynamic losses are relatively small for each vehicle.

Figure 5:
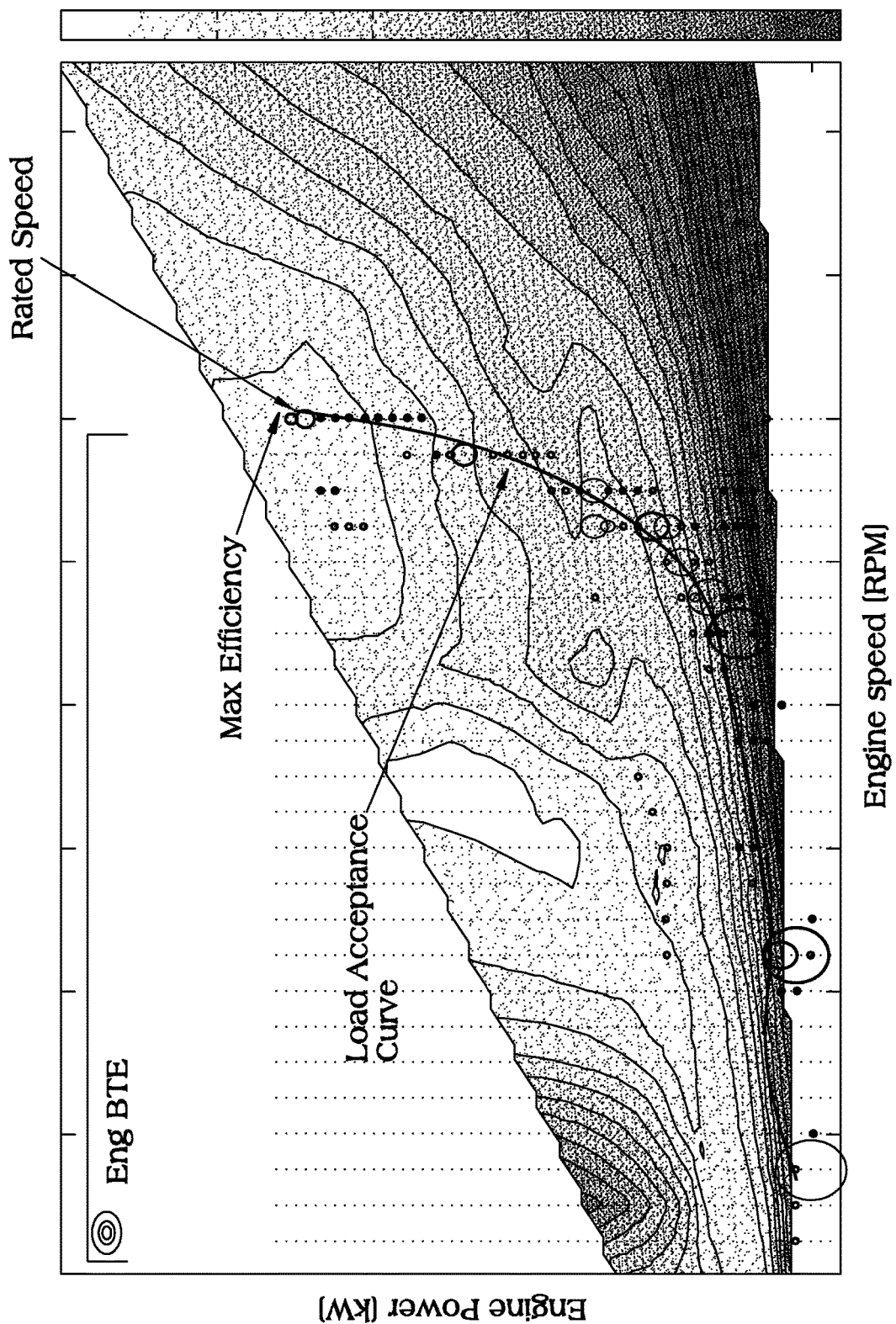
FIG. 5 depicts an example of a load acceptance curve juxtaposed with a vehicle engine rated speed.

In FIG. 5 a load acceptance curve is shown for an engine that has a highest efficiency at the rated speed of the engine. Operating points of the engine along the load acceptance curve that are not at the rated speed are more inefficient, leading to higher fuel consumption. Since the vehicles in the illustrated example of FIG. 4 have comparatively low aerodynamic losses, higher speeds are more efficient than lower speeds, contrary to conventional wisdom. Therefore, in one example, the vehicle speed target for a route segment can be so that the engine speed operates at the highest efficiency along the load acceptance curve for as long as possible.

Figure 6:
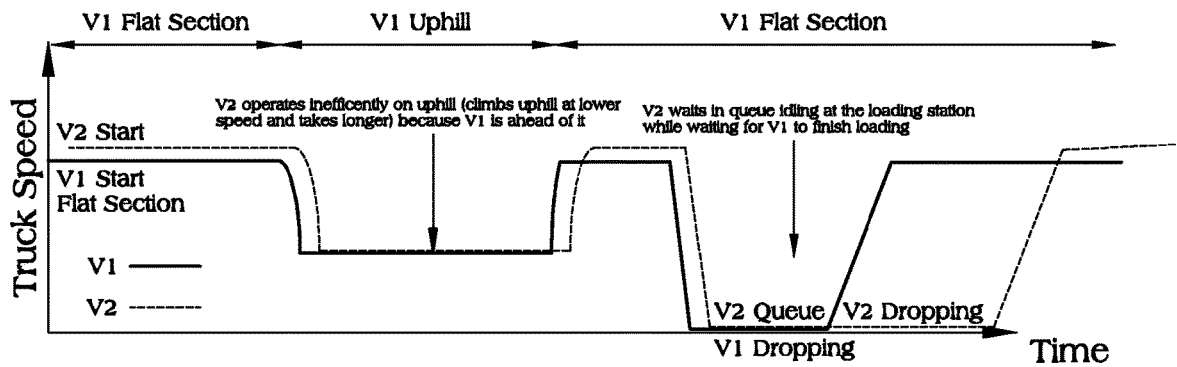
FIG. 6 depicts an example schematic of a baseline configuration for multi-vehicle load delivery management.
Figure 7:
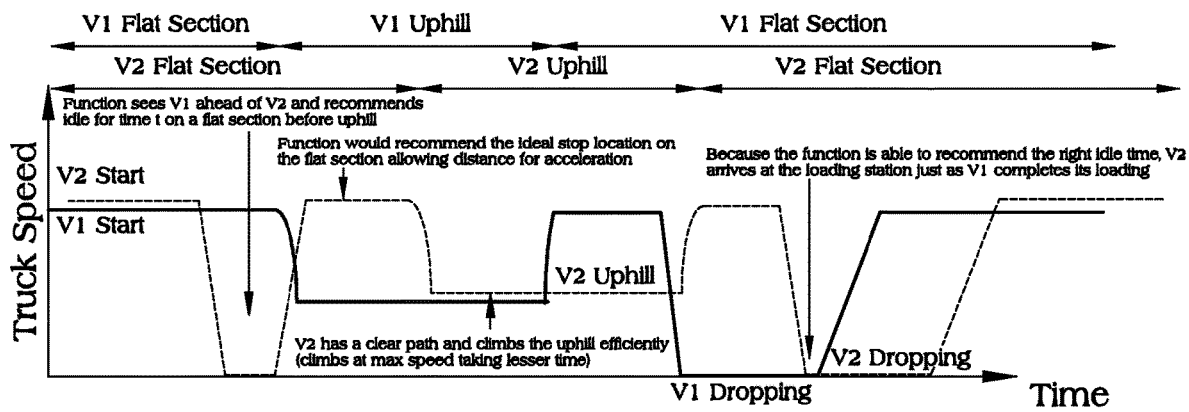
FIG. 7 depicts an example schematic of a configuration for optimum idling for multi-vehicle load delivery management.

Referring to FIGS. 6 and 7 in conjunction with FIG. 4, vehicle V1 is the vehicle-in-front and vehicle V2 is the control vehicle. In a baseline configuration, vehicle V1 operates at a lower vehicle speed than vehicle V2 due to, for example, driver behavior, poor performance, over-loaded conditions, different type of truck/vehicle, terrain conditions such as slush or sand causing high rolling resistance, etc. Vehicle V2 can reach higher speeds than vehicle V1 but is obstructed by vehicle V1, particularly on the upslope of the route or in regions or segments of high rolling resistance along the route. This lower speed of vehicle V2 is inefficient and also results in vehicle V2 spending more time on the uphill slope causing higher fuel consumption and lower productivity than if operating at a greater, more efficient speed such as at its rated speed. In addition, vehicle V2 waits in queue at the dropping and/or loading stations, as shown in FIG. 6, due to unloading of the vehicle V1.

Vehicle speed management controller 14 can be configured to control the speed and torque of vehicle V2 to improve these outcomes, such as shown in FIG. 7. For example, vehicle speed management controller 14 receives information from vehicle V1 and recommends an idle time t on a flat segment of the route, or at a distance before the high rolling resistance region or segment, to allow vehicle V2 to climb the hill or traverse the segment at maximum efficient speed and to reduce or eliminated idle time at the dropping station by controlling idle time t so that vehicle V2 also arrives after vehicle V1 drops its load at the dropping station, avoiding vehicle queuing at the dropping station. In another embodiment, vehicle speed management controller 14 reduces the speed of vehicle V2 along route without stopping to allow for traversal of the upslope or high rolling resistance segments or regions at maximum efficient speed. In another embodiment, vehicle speed management controller 14 compares a fuel consumption between an idle alternative and reduced speed alternative and selects one or the other based on one or more a fuel economy, productivity, total cost of ownership, and/or utilization of infrastructure such as the loading/dropping station, etc.

In one embodiment, vehicle speed management controller 14 is configured to provide a target speed reference for dual vehicle speed management in addition to determining optimum idling location and/or duration. Dual vehicle speed management utilizes information from the vehicle-in-front along with look ahead information of the route such as grade/rolling resistance to output a route segment vehicle speed target and vehicle idle time and idle location for two more vehicles to improve productivity and/or efficiency.

In one embodiment, vehicle speed management controller 14 supplements a VSM control scheme that only considers look ahead grade information by generating a first vehicle speed target or reference based on route segments and the vehicle-in-front data. The VSM control scheme modulates the final speed target or reference around the first vehicle speed reference for additional benefits.

In one example, dual vehicle speed management includes vehicle speed management controller 14 being configured to determine target speeds for one or more route segments along with optimal vehicle stop location and stop duration so the vehicle has a clear path along its route and is not obstructed or delayed by other vehicles along the route. A clear path means the control vehicle V2 is not inhibited or constrained by behavior of the vehicle-in-front, and can operate at more optimal vehicle speeds for that segment of the route without impacting trip time. Vehicle speed management controller 14 utilizes information from the vehicle-in-front in addition to information associated with operating parameters of the vehicle V2 and look ahead information to recommend route segment speed limits, stop location and idle time so the control vehicle V2 operates at maximum efficiency for that segment of the route. The operating parameters can be obtained from various means, including vehicle-in-front communications, vehicle-to-vehicle communications, forward looking sensors, and vehicle-to-central control station communications.

Figure 8:
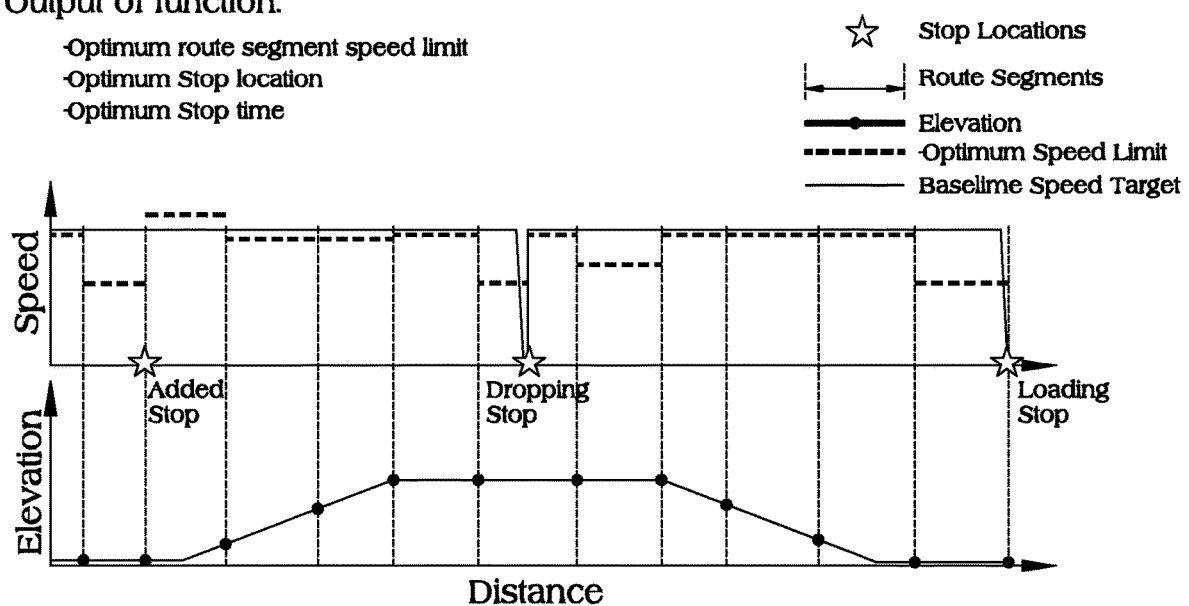
FIG. 8 depicts an example of schematic for dual vehicle speed management along a route.

FIG. 8 provides an example behavior or operating profile of a control vehicle V2 controlled in response to dual vehicle speed management. Vehicle speed management controller 14 outputs an optimum route segment speed limit, stop location and stop time along the route, and vehicle V2 can be controlled automatically or by the operator in response to these recommendations.

Figure 9:
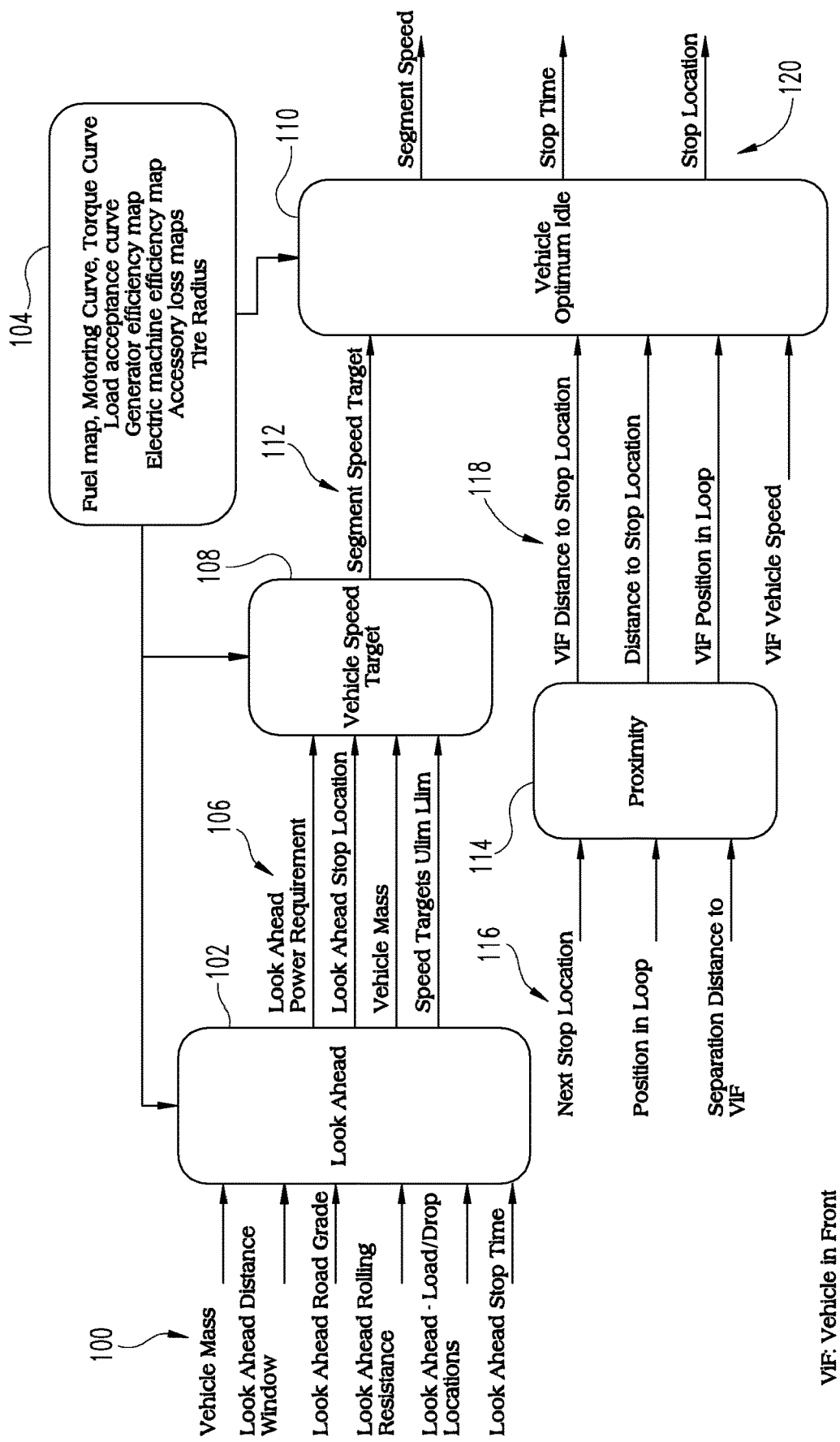
FIG. 9 depicts an embodiment of a controller apparatus for dual vehicle speed management.

FIG. 9 provides one embodiment of vehicle speed management controller 14 configured for dual vehicle speed management of a vehicle V2. Vehicle speed management controller 14 includes a plurality of modules that receive various inputs and determine various intermediate outputs that are used to ultimately determine control parameters for the vehicle, such as a vehicle speed target, an idle stop location, and an idle stop duration.

In the illustrated embodiment, vehicle speed management controller 14 includes a look ahead determination module 102 that receives one or more look ahead inputs 100 that include vehicle mass and various look ahead conditions. Possible look ahead condition inputs include, for example, distance window, road grade, rolling resistance, loading/dropping locations, and stop time. Look ahead determination module 102 also receives one or more vehicle parameter inputs 104. Vehicle parameter inputs include, for example, fuel maps, motoring curves, torque curves, load acceptance curves, generator efficiency maps, electric machine efficiency maps, accessory loss maps, and tire radius, for example. Vehicle parameter inputs 104 may be stored in a memory of vehicle speed management controller 14, provided by another controller of the vehicle, or from a controller that is remote from the vehicle.

Look ahead determination module 102 determines or calculates target speed parameters 106 for input to a vehicle speed target determination module 108. Target speed parameters 106 may include, for example, a look ahead power requirement, a look ahead stop location, the vehicle mass, and target speed limits, such as an upper speed limit. Vehicle speed target determination module 108 outputs a segment speed target 112 based on the target speed parameters 106 to a vehicle optimum idle determination module 110.

Vehicle speed management controller 14 also includes a proximity module 114 that receives proximity based inputs 116 associated with the vehicle. Proximity based inputs 116 include, for example, the next stop location, the position of the vehicle in the loop of vehicles, and a separation distance to a vehicle-in-front. Proximity module 114 determines, in response to the proximity based inputs 116, proximity based outputs 118. Proximity based outputs 118 may include, for example, the vehicle-in-front distance to the stop location, the distance to the stop location, the vehicle-in-front position in the loop, and the vehicle-in-front speed. Proximity based outputs 118 are also provided to vehicle optimum idle determination module 110. Vehicle optimum idle determination module 110 determines one or more load delivery management outputs 120 for the vehicle, such as a segment speed reference, stop time, and stop location, that optimize or provide the desired vehicle efficiency and load delivery outcomes in response to the segment speed target 112 and the one or more proximity based outputs 118.

Figure 10:
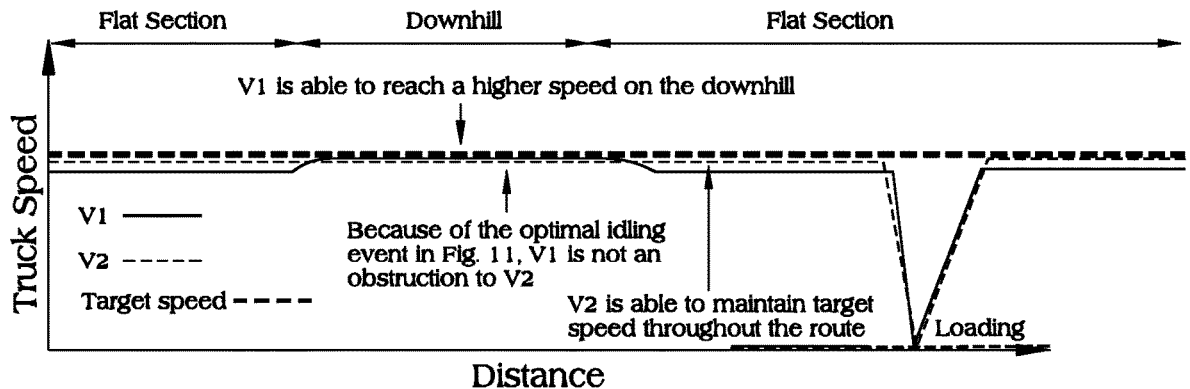
FIG. 10 depicts an example schematic of a baseline dual vehicle operation along a dropping to loading station segment of the route.
Figure 11:
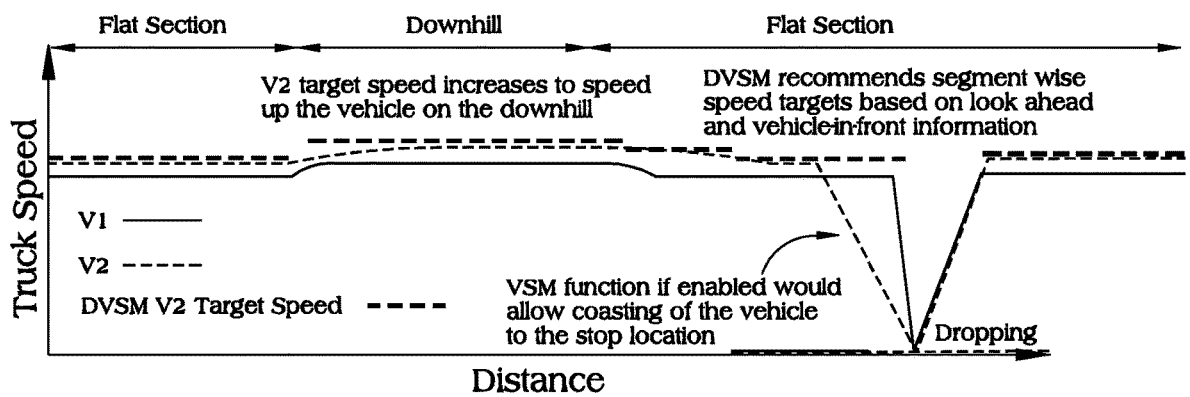
FIG. 11 depicts an example schematic of operations for dual vehicle speed management from the dropping station to the loading station segment of the route.

FIGS. 10 and 11 provide another example of vehicle speed management controller 14 being configured for dual vehicle speed management from the dropping station to the loading station, such as shown in FIG. 4. As shown in FIG. 10, the vehicle-in-front V1 is able to achieve higher speeds, such as the target speed on the downhill segment, but travels at lower speeds on the flatter segments of the route. Due to the idle location and time for vehicle V2 controlled as described in FIG. 7, vehicle V1 does not obstruct vehicle V2 in this segment of the route and vehicle V2 is able to maintain a target speed throughout the route to the loading station.

In a further embodiment, using VSM vehicle V1 and vehicle 2 can be allowed to coast downhill at speeds higher than the target speed due to potential energy and coast to the target speed along the flat route segment. Vehicle speed management controller 14 can be configured to, based on this look ahead information and operating data from the vehicle-in-front V1, make modifications and recommendations to the segment-wise target speed of control vehicle V2 for additional fuel efficiency benefits. VSM on control vehicle V2 could also work in conjunction with dual vehicle speed management to modulate the dual vehicle speed target of control vehicle V2 and allow vehicle V2 to coast to a stop location.

In other embodiments, vehicle speed management controller 14 includes engine start/stop capabilities that can stop engine 18 in response to one or more engine stop conditions being met along the route. For an engine stop event, there is no fueling of the engine, so more consideration may be provided to recommend an idle event due to reduction of fuel consumed for an additional idle event with subsequent efficient operation of the truck, versus fuel consumed in inefficient operation of the truck without a vehicle idling event. For example, if engine start-stop operation is available and engine stop conditions are satisfied, additional fuel savings can be accumulated since fuel is not consumed when the vehicle is stopped, so start-stop enablement can modify a recommendation from the dual vehicle speed management controller regarding segment speed limits, stop locations and stop times.

Figure 12:
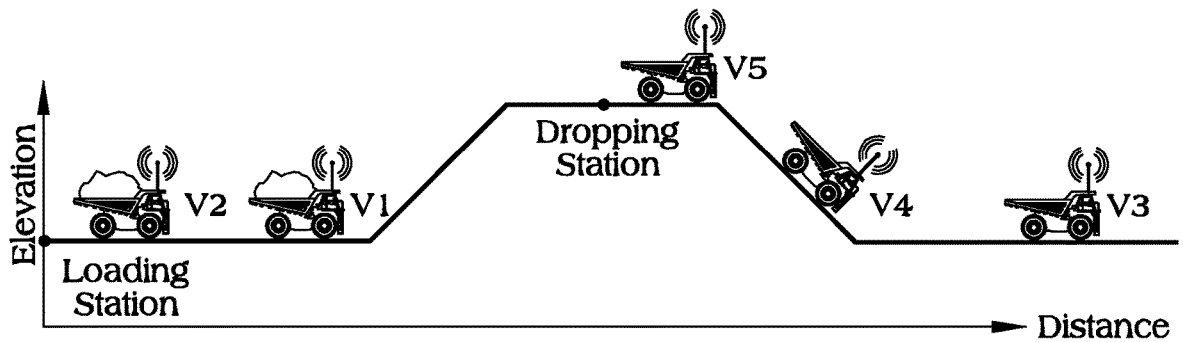
FIG. 12 depicts an embodiment of a weakest link type multi-vehicle load management system along a route with a loading station and a dropping station.
Figure 13:
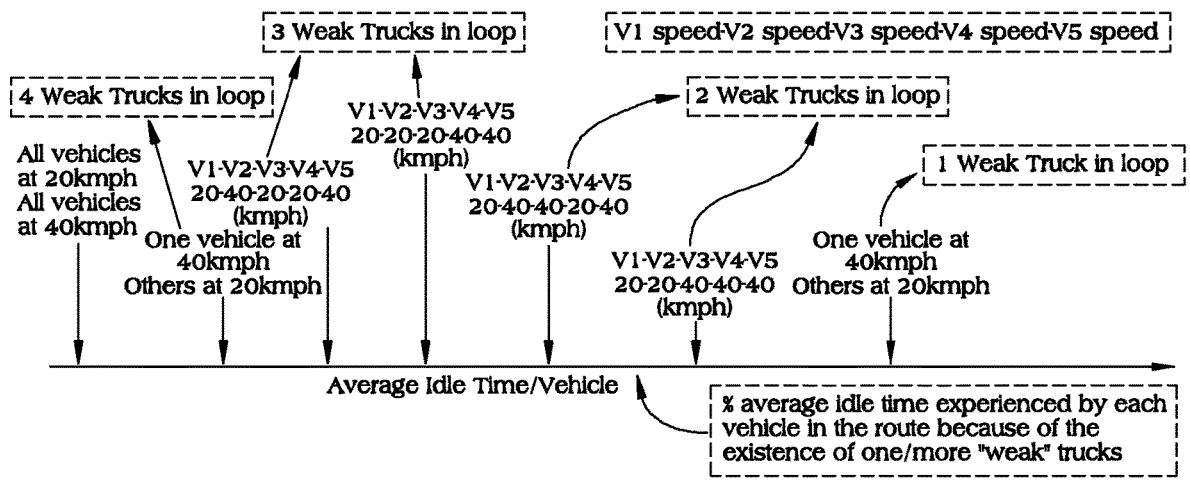
FIG. 13 illustrates and example of operating parameters for the multiple vehicles along the route depicted in FIG. 12.

Referring now to FIGS. 12-13, another embodiment of vehicle speed management controller 14 is further or alternatively configured to provide "weakest link management" by utilizing information from all of the vehicles in the route in addition to look ahead information regarding route grade and/or rolling resistance. Vehicle speed controller 14 identifies one or more of vehicles V1-V5 that are causing lower performance of the route, and recommends or performs a specific output on the "weakest link" vehicle to improve productivity/efficiency. The output can include, for example, changing vehicle speed, rearranging the vehicle(s) in the route order, changing an allowed payload of the weakest link vehicle(s), removing vehicle(s) from the route, assigning additional stop times/locations for vehicle(s) in the route, etc.

In the illustrated example, operating parameters are available from all the vehicles V1-V5 to the vehicle speed management controllers 14 in each of the vehicles. In response to one or more vehicles being identified as a bottleneck or reducing the productivity of the other vehicles, a weakest link remediation output can be provided by vehicle speed management controller 14 to the identified weakest link vehicle(s). For example, one or more slower vehicle(s) can cause higher idles times for the remaining vehicles in the route. Therefore, these slower vehicle(s) can be repositioned in the route after the faster vehicle(s), or replaced, reduced in payload, etc., reducing the collective idle time for all vehicles.

Figure 14:
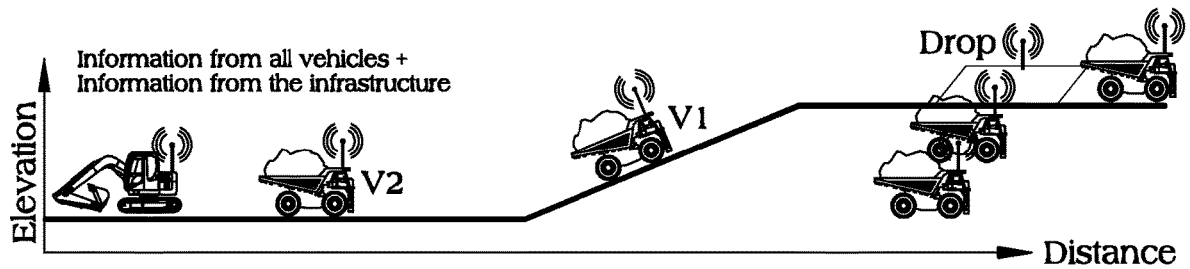
FIG. 14 depicts another embodiment of a multi-vehicle load management system along a route with a segment between a loading station and a dropping station.
Figure 15:
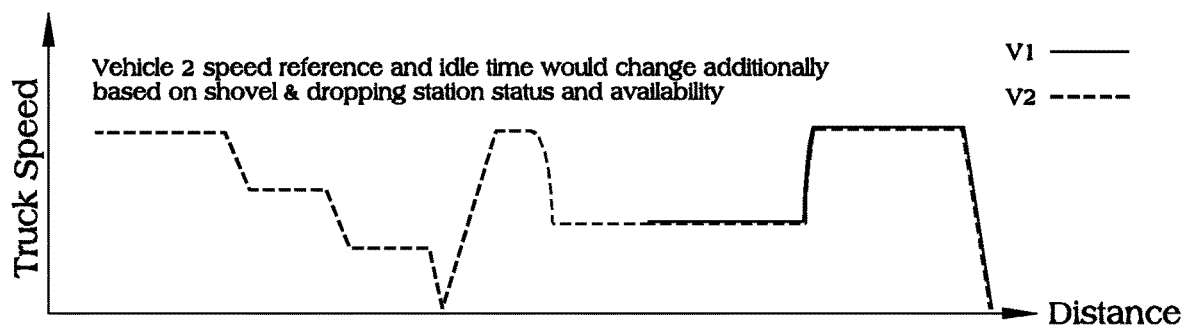
FIG. 15 illustrates an example of vehicle speed management of one of the vehicles along the route depicted in FIG. 14.

Referring to FIGS. 14-15, another embodiment of vehicle speed management controller 14 is further or alternatively configured to manage load delivery from multiple vehicles. Vehicle speed management controller 14 utilizes information from all the vehicles along the route in addition to one or more infrastructure conditions along the route, such as associated with one or more of a loading station, a dropping station, control center, a loading vehicle (such as excavators or wheel loaders), a receiving vehicle, etc., in addition to look ahead information such as route grade/rolling resistance. Vehicle speed management controller 14 modulates vehicle speed and/or recommended idle locations and idle time to lead to overall improvement in efficiency of the route. For example, as shown in FIGS. 14 and 15, vehicle V2 speed target and idle time are adjusted along the route from baseline targets or references according to loading and dropping station availability. The one or more infrastructure conditions can be obtained by a variety of methods, including delivery vehicle(s) to infrastructure vehicle(s) communications, delivery vehicle(s) to infrastructure equipment communications, etc.

In certain embodiments, the vehicle speed management controller 14 determines if look ahead or horizon based information is available. Such information can be predictive in nature. Examples of look ahead information include, but are not limited to route grade of the vehicle route, rolling resistance, stop locations and stop times along the route. The look ahead information and the vehicle payload are provided as inputs to a horizon based algorithm at the vehicle speed management. The vehicle speed management controller 14 can use a horizon based algorithm to determine one or more of an engine speed limit, an engine speed target, vehicle speed limit, vehicle target speed, vehicle stop location, vehicle stop time, and an engine torque limit. In an embodiment, the horizon based algorithm is a dynamic rule based engine speed limit. In another embodiment, the horizon algorithm is an online optimizer configured to determine an engine speed limit. In an embodiment, the horizon based algorithm is a dynamic rule based vehicle speed limit/target. In another embodiment, the horizon algorithm is an online optimizer configured to determine a vehicle speed limit/target. In another embodiment, the horizon based algorithm is a dynamic rule based engine torque limit. In another embodiment, the horizon based algorithm is an online optimizer configured to determine an engine torque limit. Combinations of one or more of these embodiments is also contemplated.

If look ahead or horizon based information is not available, the vehicle speed management controller 14 may use current or past data associated with the vehicle payload and route grade. A rule based algorithm receives the vehicle payload and current route grade to determine an engine speed limit for VSM. The current route grade may be determined using an online estimation algorithm, route grade database, physical sensor data, GPS data or various combinations of the aforementioned sources. Examples of no horizon based algorithm rules include, but are not limited to increases in engine speed limit with increasing payload and increases in engine speed limit with increasing magnitude route grade.

In an embodiment, a vehicle speed management controller 14 may be configured to manage the vehicle speed to increase fuel efficiency for VSM, to manage speed and/or optimal idling time/location based on dual vehicle speed management with or without look ahead information, weakest link management based on one or more vehicles bottlenecking the route, and/or load delivery management based on infrastructure conditions/availability. The vehicle speed management controller 14 may be implemented using one or more of predicted and/or current vehicle route and grade information, mass of the vehicle, predictive and or current information about nearby vehicles, predicted or current vehicle drive system performance information, target vehicle speeds and speed limits desired by operators or defined by the vehicle route.

Examples of one or more parameters that may be used by vehicle speed management controller 14 to implement vehicle load delivery management include, but are not limited to pre-downhill parameters, pre-uphill parameters, machine drive system efficiency parameters, optimized route average time parameters, route segment based optimization of vehicle speed parameters, maximize coasting parameters, coordinated vehicle speed and engine brake thermal efficiency (BTE) optimization parameters, infrastructure parameters, vehicle-in-front parameters, weakest link vehicle parameters, vehicle-to-vehicle communications and vehicle-to-central control station communications.

In an embodiment, the vehicle speed management controller 14 is configured to modulate the vehicle target speed when going down a hill with look ahead data, vehicle-in-front data, or learned information using an algorithm to retain appropriate kinetic energy. This reduces the use of fuel to re-accelerate the vehicle for future terrain, such as for example, the next uphill segment of the route.

In an embodiment, the vehicle manager or owner may be able to make route time trade-offs with fuel economy or other parameters via tunable parameters in the vehicle speed management system algorithm or via route or region based speed targets and limits communicated to or stored in the vehicle, such as via the vehicle speed management controller 14.

In an embodiment, the vehicle speed management system may be used to adjust machine drive system efficiency behavior to position the vehicle speed at a level to attempt to maximize the drive system efficiency for multiple vehicles in the route.

Various components of the drive system for the vehicle including, but not limited to, the alternator/generator, power electronics, and drive motors may be operating at speeds and/or torques and/or electrical levels which convert otherwise usable energy into wasted heat. In an embodiment, the vehicle speed management controller 14 modulates the vehicle target speed using an algorithm in which vehicle drive efficiencies including, but not limited to, the alternator/generator, power electronics, and drive motors are measured or estimated. The vehicle speed management controller 14 is configured to adjust the target speed to or, at least, toward an optimal operating point in order to increase or maximize productivity and/or efficiency.

In an embodiment, the vehicle speed management controller 14 uses vehicle-in-front and look ahead route grade/rolling resistance as an input to determine whether to issue an instruction or recommendation for a vehicle to idle or change speed. In another embodiment, vehicle speed management controller 14 issues a control command that automatically controls vehicles V1, V2, etc. to a desired speed or idle condition to improve overall efficiency. In an embodiment, the instruction is presented to a vehicle driver via a user interface. An example of a user interface includes, but is not limited to a display located within the vehicle, an audible indicator, or some combination thereof.

A route may be partitioned into route segments that are defined based on whether the segment is a flat segment, a pre-uphill segment, an uphill segment or a pre-uphill segment, a downhill segment and whether the vehicle is loaded or unloaded. The different segments may be defined as one or more of the following: loaded flat, loaded uphill, loaded downhill, unloaded flat, unloaded uphill and unloaded downhill.

In an embodiment, the vehicle speed management controller 14 may be configured to define an average vehicle speed for each segment to meet the desired route average speed. In an embodiment, the vehicle speed for the individual segments may be optimized to provide a relatively improved miles per gallon fuel efficiency while meeting the optimal route average speed selected to maximize mine efficiency as described above thereby further increasing the overall mine efficiency.

In an embodiment, the vehicle speed management controller 14 may be configured to implement coasting and/or engine start/stop as a mechanism for enhancing fuel efficiency of the vehicle.

Examples of the types of coasting that may be implemented by the vehicle speed management controller 14 may include, but is not limited to, zero fueling coasting, idle coasting, in gear coasting, neutral coasting, coasting at a defined engine speed or engine torque or engine power, and engine stop/start.

In an embodiment, the vehicle speed management controller 14 may be configured to implement speed management mechanisms using vehicle to vehicle communications, vehicle to infrastructure communications and/or vehicle to server communications.

In certain embodiments, the vehicle speed management controller 14 forms a portion of a processing subsystem including one or more computing devices having memory, processing, and communication hardware. The vehicle speed management controller 14 may be a single device or a distributed device, and the functions of the vehicle speed management controller 14 may be performed by hardware and/or software. The vehicle speed management controller 14 may be included within, partially included within, or completely separated from an engine controller (not shown). The vehicle speed management controller 14 is in communication with any sensor or actuator throughout the systems disclosed herein, including through direct communication, communication over a datalink, and/or through communication with other controllers or portions of the processing subsystem that provide sensor and/or actuator information to the vehicle speed management controller 14.

Vehicle speed management controller 14 includes stored data values, constants, and functions, as well as operating instructions stored on a non-transient computer readable medium. Any of the operations of example procedures described herein may be performed at least partially by the vehicle speed management controller 14. In certain embodiments, the vehicle speed management controller 14 includes one or more modules structured to functionally execute the operations of the vehicle speed management controller 14. The description herein including modules emphasizes the structural independence of the aspects of the vehicle speed management controller 14, and illustrates one grouping of operations and responsibilities of the vehicle speed management controller 14. Other groupings that execute similar overall operations are understood to be within the scope of the present application. Modules may be implemented in hardware and/or instructions stored on a non-transient computer readable medium, and modules may be distributed across various hardware or instructions stored on a non-transient computer readable medium. Operations illustrated are understood to be exemplary only, and operations may be combined or divided, and added or removed, as well as re-ordered in whole or in part.

Certain operations described herein include operations to interpret or determine one or more parameters. Interpreting and/or determining, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

In addition, the methods and procedures and disclosed herein and related descriptions provide an illustrative embodiment of performing example procedures for providing one or more multiple vehicle load delivery management. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Various aspects of the present disclosure are contemplated. In one aspect, a method includes operating at least two vehicles along a route; determining at least one of a segment speed target, a stop time and a stop location for at least one vehicle on the route in response to look ahead conditions along the route and further in response to one or more operating parameters associated with a vehicle-in-front of the at least one vehicle; and adjusting a speed of the at least one vehicle in response to the at least one of the segment speed target, the stop time and the stop location.

In another aspect, an electronic controller is associated with a vehicle operable along a route. The electronic controller is operable to receive one or more operating parameters associated with a vehicle-in-front of the vehicle. The electronic controller is further operable to receive look ahead conditions of the route. The electronic controller is configured to determine at least one of a route segment speed target, a stop time, and a stop location for the vehicle on the route in response to the one or more operating parameters and the look ahead conditions, and to control the vehicle in response to the at least one of the segment speed target, the stop time, and the stop location.

In one embodiment, the one or more operating parameters associated with the vehicle-in-front include: a speed of the vehicle-in-front; a distance from the at least one vehicle to the vehicle-in-front; a distance to a stop location for the at least one vehicle and for the vehicle-in-front; and a position of the at least one vehicle and of the vehicle-in-front along the route.

In another embodiment, the look ahead conditions include at least one of: a look ahead power requirement, a look ahead stop location; a look ahead distance window, a look ahead route grade, a look ahead rolling resistance, a look ahead drop and load locations, a look ahead stop time, and look ahead speed limits.

In another embodiment, a bottleneck or weakest link condition associated with the at least two vehicles is determined and a recommendation is provided to at least one of: change a vehicle speed reference of one or more vehicle, rearrange the order of the vehicles in the route, change an allowed payload of one or more of the vehicles, remove one or more vehicles from the route, assign an additional stop time, and assign an additional stop location for one or more vehicles in the route.

In another embodiment, one or more infrastructure conditions are determined and one or more of the segment speed target, the stop time and the stop location is adjusted in response to the one or more infrastructure conditions. In a refinement of this embodiment, the one or more infrastructure conditions are determined from one or more infrastructure operating parameters from one or more infrastructure vehicles in response to the one or more infrastructure conditions, and an output of one or more infrastructure vehicles is adjusted in response to the one or more infrastructure conditions and the adjusted speed of the at least one vehicle. In a further refinement, the one or more infrastructure conditions are obtained via communication between the one or more infrastructure vehicles and at least one of the at least two vehicles along the route.

In another embodiment, the one or more operating parameters and/or the one or more infrastructure conditions are obtained from at least one of: the vehicle-in-front, vehicle to vehicle communications, forward looking sensors, horizon information, vehicle to infrastructure communications, vehicle to server communications, and vehicle to central control station communications.

According to another aspect, a system includes a vehicle one or more prime movers for moving the vehicle along a route and an electronic controller associated with the vehicle operable to control a speed of the vehicle along the route. The electronic controller includes a look ahead determination module that is configured to receive one or more look ahead condition inputs associated with the route and one or more vehicle parameter inputs associated with the vehicle, and determine one or more target speed parameters for the vehicle in response to the one or more look ahead condition inputs and the one or more vehicle parameter inputs. The electronic controller also includes a vehicle speed target determination module configured to determine a segment speed target in response to the target speed parameters and the one or more vehicle parameters and a proximity module configured to determine one or more proximity based outputs in response to one or more proximity based inputs associated with the vehicle. The controller further includes a vehicle optimum idle module configured to determine one or more load delivery management outputs for the vehicle in response to the segment speed target and the one or more proximity outputs. The speed of the vehicle is controlled in response to the one or more load delivery management outputs.

In one embodiment, the one or more look ahead condition inputs include one or more of a distance window ahead of the vehicle, a grade of the route, a rolling resistance of the vehicle on the route, one or more loading/dropping locations along the route, and a stop time along the route. In another embodiment, the one or more vehicle parameter inputs include one or more of a fuel map, a motoring curve, a torque curve, a load acceptance curve, a generator efficiency map, an electric machine efficiency map, an accessory loss map, gear ratios in a driveline, and a tire radius of the vehicle.

In yet another embodiment, the one or more target speed parameters include one or more of a look ahead power requirement, a look ahead stop location, a mass of the vehicle, and a target speed limit. In yet another embodiment, the one or more load delivery management outputs include one or more of a segment speed reference, a stop time, and a stop location.

In a further embodiment, the one or more proximity based inputs include a next stop location for the vehicle, a position of the vehicle in a loop of vehicles, and a separation distance to a vehicle-in-front of the vehicle. In a refinement of this embodiment, the one or more proximity based outputs include one or more of a vehicle-in-front distance to a stop location, a distance to the next stop location, a vehicle-in-front position in the loop, and a vehicle-in-front speed.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   operating at least two vehicles along a route;
   determining a route segment speed target, a stop time and a stop location for at least one vehicle of the at least two vehicles on the route in response to look ahead conditions along the route and further in response to one or more operating parameters associated with a vehicle-in-front of the at least one vehicle, wherein the look ahead conditions include a look ahead stop location and the one or more operating parameters include a distance to the look ahead stop location for the at least one vehicle and for the vehicle-in-front; and
   adjusting a speed of the at least one vehicle in response to the route segment speed target, the stop time and the stop location.

2. The method of claim 1, wherein the one or more operating parameters associated with the vehicle-in-front further include: a speed of the vehicle-in-front; a distance from the at least one vehicle to the vehicle-in-front; and a position of the at least one vehicle and of the vehicle-in-front along the route.

3. The method of claim 1, wherein the look ahead conditions further include at least one of: a look ahead power requirement, a look ahead distance window, a look ahead route grade, a look ahead rolling resistance, a look ahead drop and load locations, a look ahead stop time, and look ahead speed limits.

4. The method of claim 1, further comprising determining a bottleneck or weakest link condition associated with the at least two vehicles and outputting a recommendation to at least one of: change a vehicle speed reference of one or more of the vehicles, rearrange the order of the vehicles in the route, change an allowed payload of one or more of the vehicles, remove one or more vehicles from the route, and assign an additional stop time or location for one or more vehicles in the route.

5. The method of claim 1, further comprising determining one or more infrastructure conditions and adjusting the segment speed target, the stop time and the stop location in response to the one or more infrastructure conditions.

6. The method of claim 5, further comprising:
   determining the one or more infrastructure conditions from one or more infrastructure operating parameters of one or more infrastructure vehicles operating along the route in addition to the at least two vehicles; and
   adjusting an output of the one or more infrastructure vehicles in response to the one or more infrastructure conditions and the adjusted speed of the at least one vehicle.

7. The method of claim 6, wherein the one or more infrastructure conditions are obtained via communication between the one or more infrastructure vehicles and the at least one vehicle of the at least two vehicles along the route.

8. The method of claim 5, wherein the one or more operating parameters are obtained from at least one of: the vehicle-in-front, vehicle to vehicle communications, forward looking sensors, horizon information, vehicle to infrastructure communications, vehicle to server communications, and vehicle to central control station communications.

9. The method of claim 1, wherein the one or more infrastructure conditions are obtained from at least one of: the vehicle-in-front, vehicle to vehicle communications, forward looking sensors, horizon information, vehicle to infrastructure communications, vehicle to server communications, and vehicle to central control station communications.

10. An apparatus, comprising:
    an electronic controller associated with a vehicle operable along a route, wherein the controller is operable to receive one or more operating parameters associated with a vehicle-in-front of the vehicle, the electronic controller further being operable to receive look ahead conditions of the route, wherein the electronic controller is configured to determine a segment speed target, a stop time, and a stop location for the vehicle on the route in response to the one or more operating parameters and the look ahead conditions, wherein the look ahead conditions include a look ahead stop location and the one or more operating parameters include a distance to the look ahead stop location for the at least one vehicle and for the vehicle-in-front, electronic controller further configured to control the vehicle in response to the of the segment speed target, the stop time, and the stop location.

11. The apparatus of claim 10, wherein the one or more operating parameters associated with the vehicle-in-front further include one or more of: a speed of the vehicle-in-front; a distance from the vehicle to the vehicle-in-front; and a position of the vehicle and of the vehicle-in-front along the route.

12. The apparatus of claim 10, wherein the look ahead conditions further include at least one of: a look ahead power requirement, a look ahead distance window, a look ahead route grade, a look ahead rolling resistance, a look ahead drop and load locations, a look ahead stop time, and look ahead speed limits.

13. The apparatus of claim 10, wherein the controller is further configured to determine at least one of a bottleneck and a weakest link condition associated with the vehicle and at least one other vehicle on the route.

14. The apparatus of claim 13, wherein, in response to the at least one of the bottleneck and the weakest link condition, the controller is configured to determine at least one of:
a change in a speed for the vehicle, a rearranged order of vehicles on the route, a change in an allowed payload of one or more vehicles on the route, a removal of one or more vehicles from the route, an additional stop time, and an additional stop location for one or more vehicles on the route.

15. The apparatus of claim 10, wherein the controller is operable to receive one or more infrastructure conditions associated with the route and adjust one or more of the segment speed target, the stop time and the stop location in response to the one or more infrastructure conditions.

16. The apparatus of claim 10, wherein the electronic controller is operably connected to receive the one or more operating parameters from at least one of: the vehicle-in-front, a vehicle-to-vehicle communication system, one or more forward looking sensors, and a central control station.

17. A system, comprising:
a vehicle including one or more prime movers for moving the vehicle along a route; and
an electronic controller associated with the vehicle operable to control a speed of the vehicle along the route, wherein the electronic controller includes:
a look ahead determination module that is configured to receive one or more look ahead condition inputs associated with the route and one or more vehicle parameter inputs associated with the vehicle, and determine one or more target speed parameters for the vehicle in response to the one or more look ahead condition inputs and the one or more vehicle parameter inputs, wherein the one or more look ahead condition inputs include one or more loading/dropping locations along the route;
a vehicle speed target determination module configured to determine a segment speed target in response to the target speed parameters and the one or more vehicle parameter inputs;
a proximity module configured to determine one or more proximity based outputs in response to one or more proximity based inputs associated with the vehicle; and
a vehicle optimum idle module configured to determine one or more load delivery management outputs for the vehicle in response to the segment speed target and the one or more proximity based outputs, wherein the speed of the vehicle is controlled in response to the one or more load delivery management outputs and the load delivery management outputs include an idle time and an idle location along the route between the loading/dropping locations.

18. The system of claim 17, wherein the one or more look ahead condition inputs include one or more of a distance window ahead of the vehicle, a grade of the route, a rolling resistance of the vehicle on the route, and a stop time along the route.

19. The system of claim 17, wherein one or more vehicle parameter inputs include one or more of a fuel map, a motoring curve, a torque curve, a load acceptance curve, a generator efficiency map, an electric machine efficiency map, an accessory loss map, gear ratios in a driveline, and a tire radius of the vehicle.

20. The system of claim 17, wherein the one or more target speed parameters include one or more of a look ahead power requirement, a look ahead stop location, a mass of the vehicle, and a target speed limit.

21. The system of claim 17, wherein the one or more proximity based inputs include a next stop location for the vehicle, a position of the vehicle in a loop of vehicles, and a separation distance to a vehicle-in-front of the vehicle.

22. The system of claim 21, wherein the one or more proximity based outputs include one or more of a vehicle-in-front distance to a stop location, a distance to the next stop location, a vehicle-in-front position in the loop, and a vehicle-in-front speed.

23. The system of claim 17, wherein the one or more load delivery management outputs include one or more of a segment speed reference, a stop time, and a stop location.

* * * * *